Figure 1:
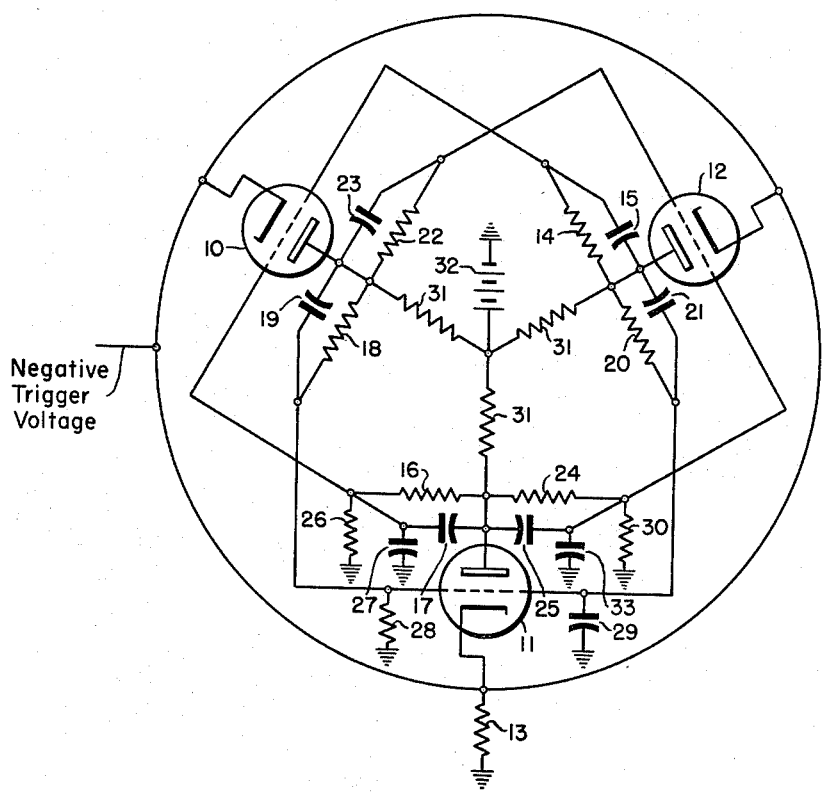

April 22, 1952 J. W. TAYLOR, JR 2,594,092
MULTIVIBRATOR
Filed March 30, 1950

WITNESSES:
Robert C. Bird
Nw. C. Groome

INVENTOR
John W. Taylor, Jr.
BY
F. E. Browder
ATTORNEY

Patented Apr. 22, 1952

2,594,092

UNITED STATES PATENT OFFICE 2,594,092

MULTIVIBRATOR

John W. Taylor, Jr., Baltimore, Md., assignor to Westinghouse Electric Corporation, East Pittsburgh, Pa., a corporation of Pennsylvania Application March 30, 1950, Serial No. 152,897

13 Claims. (Cl. 250—27)

This invention relates to multivibrators, and it has as objects to simplify, and to reduce the number of components used in, multivibrators.

In some radar systems the antennas use a plurality of beams for determining the direction in which the antennas should be turned in order to point towards the target. The radar set is operated sequentially over these beams, and the signals are compared. Rapid comparison is necessary for avoiding as much fluctuation in strength of the signals reflected from the target, as possible between lobing, so that electronic switching is required. Two beams are sufficient to track a target in azimuth, a scale-of-two multivibrator being used for communication; but three beams are required to track a target in elevation as well as azimuth, necessitating a scale-of-three multivibrator.

Prior systems have used either a chain of three pairs of scale-of-two multivibrators, or three interconnected pentodes. Either system requires three envelopes, one requiring three twin-triodes, and the other requiring three pentodes.

The pentode circuit operates by virtue of the fact that conduction can be cut-off by either the control grid or the suppressor grid, one of two tubes in the triangle controlling the control grid of, and the other of the two tubes controlling the suppressor grid of, the third tube.

This invention provides a scale-of-three multivibrator in which two tubes in the triangle control the same grid of the third tube instead of separate grids. This enables one and one-half twin-triodes to be used instead of three pentodes, thus cutting the number of tubes required in half.

This invention is applicable not only to the rapid commutation of radar lobing antennas, but to repetition rate reducers for Geiger counters, and other applications requiring rapid electronic switching.

Another object of the invention is to simplify scale-of-three multivibrators.

Another object of the invention is to reduce the number of electron tubes required for a scale-of-three multivibrator.

Figure 2:
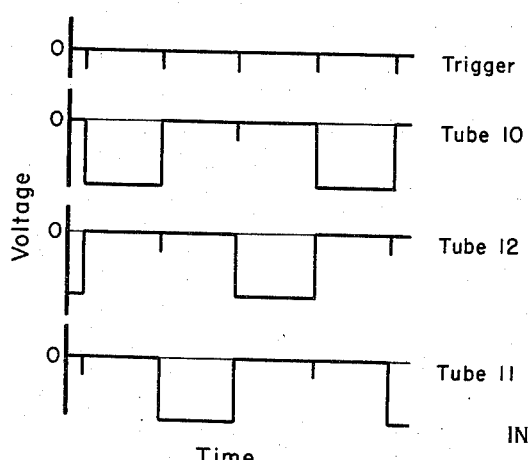

The invention will now be described with reference to the drawing, of which:

Fig. 1 is a circuit schematic of a scale-of-three multivibrator embodying this invention; and Fig. 2 is a graph illustrating the trigger potential pulses and the waveforms of the potentials at the plates of the three tubes of Fig. 1.

The three triodes 10, 11 and 12 have their cathodes interconnected and connected through the cathode resistor 13 to ground.

The grid of the tube 10 is connected through the resistor 14 shunted by the capacitor 15, to the plate of the tube 12, and through the resistor 16 shunted by the capacitor 17, to the plate of the tube 11. Likewise the grid of the tube 11 is connected through the resistor 18 shunted by the capacitor 19, to the plate of the tube 10, and through the resistor 20 shunted by the capacitor 21, to the plate of the tube 12. Likewise the grid of the tube 12 is connected through the resistor 22 shunted by the capacitor 23, to the plate of the tube 10, and through the resistor 24 shunted by the capacitor 25, to the plate of the tube 11.

The grid of the tube 10 is connected through the resistor 26 shunted by the capacitor 27, to ground. Likewise the grid of the tube 11 is connected through the resistor 28 shunted by the capacitor 29, to ground. Likewise the grid of the tube 12 is connected through the resistor 30 shunted by the capacitor 33, to ground.

The plates of the tubes are connected through the load resistors 31 to the positive terminal of the plate voltage source 32.

The resistors and capacitors connecting the grids and the plates of the tubes, and connecting the grids of the tubes to ground, are voltage dividers, and have such values that the conduction of either of the tubes will drop the grids of the others below cut-off. However, the resistor and capacitor connecting a grid of one of the tubes to a plate of one of the other two tubes, each have a different value than the resistor and capacitor connecting that grid to the plate of the other of the two tubes, so that the amount that grid remains below cut-off depends upon which of the said other tubes is conducting.

By way of example, the tubes 10, 11 and 12 may each be one-half of a 2C51 with a plate voltage of 250 volts. The grid resistors 26, 28 and 30 may each have a resistance of 3.3 megohms. The resistors 14, 18 and 24 may each have a resistance of 6.8 megohms. The resistors 16, 20 and 22 may each have a resistance of 10.0 megohms. The resistors 13 and 31 may each have a resistance of 100,000 ohms. The capacitors 27, 29 and 33 may each have a value of 82 micro-microfarads. The capacitors 15, 19 and 25 may each have a value of 39 micro-microfarads. The capacitors 17, 21 and 23 may each have a value of 27 micro-microfarads.

In operation, assuming that all three multivibrator tubes conduct equally, a momentary increase in conduction of one of the tubes, say the tube 10, will increase the cathode voltages of the tubes 11 and 12 due to the increased voltage drop through the common cathode resistor 13. At the same time, the grid voltages of the tubes 11 and 12 will be reduced due to their voltage divider coupling from the plate of the tube 10. These two effects tend to reduce the conduction of the tubes 11 and 12, and coupling from their plates to the grid of the tube 10 tends to amplify the original increase in conduction of the tube 10. This process will continue until stability is reached with the tube 10 fully conducting, and the tubes 11 and 12 non-conducting. At this time, the grid voltage of the tube 10 will be 0. Its plate is connected to the grid of the tube 11 through the resistor 16 having a value of 10.0 megohms and the capacitor 17 having a value of 27 micro-microfarads, and is connected to the grid of the tube 12 through the resistor 14 having a value of 6.8 megohms and the capacitor 15 having a value of 39 micro-microfarads. This difference in the values of the voltage dividers will cause the tube 12 to have a grid voltage of $-25$ volts and the tube 11 to have a grid voltage of $-37$ volts.

Then when a negative trigger voltage is applied to the interconnected cathodes of the tubes, the tube 12, the bias voltage of which is $-25$ volts, will start conducting before the tube 11, the bias voltage of which is $-37$ volts, and then becomes fully conductive while the tubes 10 and 11 become non-conducting.

The grid bias voltage of the tube 12 will then be zero; the bias voltage of the tube 11 will be $-25$ volts, and the bias voltage of the tube 10 will by $-37$ volts, so that when the next negative trigger voltage is applied to the cathodes of the tube, the tube 11 will start conducting before the tube 10, and then becomes fully conductive while the tubes 10 and 12 become non-conducting.

The grid bias of the tube 11 will then be zero; the bias voltage of the tube 13 will be $-25$ volts, and the bias voltage of the tube 11 will be $-37$ volts, so that on the next trigger the tube 10 will become conductive and take control again. Thus the triggers will shift conduction cyclicly around the loop, each tube becoming conductive following every third trigger.

Fig. 2 of the drawing illustrates the waveforms of the potentials of the plate circuits of the tubes as they are triggered in succession.

The circuit constants given in the foregoing, were chosen for maximum stability, and as a result it was possible to vary the supply voltage from 180 to 400 volts with no effect upon the operation of the circuit. The switching time is relatively slow-several microseconds but the large time constants involved make the circuit insensitive to positive trigger voltages. This discrimination is advantageous but may be sacrificed to obtain faster switching if that is desired.

In the annexed claims, the term "tube" is intended to refer to one of several electron tube units in a common envelope as well as to an electron tube unit in its individual envelope.

I claim as my invention:

1. A scale-of-three multivibrator comprising three electron tubes each having a cathode, a control grid and an anode, resistors connecting the grid of each tube with the anodes of the other tubes, an anode voltage supply source having a positive terminal connected to said anodes, means interconnecting said cathodes, and a cathode resistor connecting said interconnected cathodes to the negative terminal of said source.

2. A scale-of-three multivibrator as claimed in claim 1 in which capacitors are shunted across said first mentioned resistors.

3. A scale-of-three multivibrator as claimed in claim 1 in which resistors are connected between said grids and said negative terminal of said source.

4. A scale-of-three multivibrator as claimed in claim 1 in which capacitors are shunted across said first mentioned resistors and in which resistors shunted by capacitors are connected between said grids and said negative terminal of said source.

5. A scale-of-three multivibrator comprising first, second and third electron tubes each having a control grid, a cathode and an anode, a first resistor connecting the grid of said first tube with the anode of said second tube, a second resistor having a higher value then said first resistor connecting said control grid of said first tube with the anode of said third tube, a third resistor having the same value as said second resistor connecting the grid of said second tube with the anode of said first tube, a fourth resistor having the same value as said first resistor connecting the grid of said second tube with the anode of said third tube, a fifth resistor having the same value as said second resistor connecting the grid of said third tube with the anode of said second tube, a sixth resistor having the same value as said first resistor connecting said grid of said third tube with the anode of said first tube, means interconnecting said cathodes, an anode voltage supply source having a positive terminal connected to said anodes, and a cathode resistor connected to said cathodes and to the negative terminal of said source.

6. A scale-of-three multivibrator as claimed in claim 5 in which capacitors having the same values are shunted across said first, fourth and sixth resistors, and capacitors having the same value lower than that of said first mentioned capacitors, are shunted across said second, third and fifth resistors.

7. A scale-of-three multivibrator as claimed in claim 5 in which resistors shunted by capacitors are connected between said grids and said negative terminal of said source.

8. A scale-of-three multivibrator as claimed in claim 5 in which capacitors having the same value are shunted across said first, fourth and sixth resistors, and capacitors having the same value lower than that of said first mentioned capacitors, are shunted across said second, third and fifth resistors, and in which resistors shunted by capacitors are connected between said grids and said negative terminal of said source.

9. A scale-of-three multivibrator comprising first, second and third electron tubes each having a control grid, a cathode and an anode, a first resistor connecting the grid of said first tube with the anode of said second tube, a second resistor connecting said grid of said first tube with the anode of said third tube, a third resistor connecting the grid of said second tube with the anode of said first tube, a fourth resistor connecting the grid of said second tube with the anode of said third tube, a fifth resistor connecting the grid of said third tube with the anode of said second tube, a sixth resistor connecting the grid of said third tube with the anode of said first tube, said second, third and fifth resistors having higher values than said first, fourth and sixth resistors, means interconnecting said cathodes, an anode voltage supply source having a positive terminal connected to said anodes, a cathode resistor connected to said cathodes and to the negative terminal of said source, and grid resistors connected to said grids and said negative terminal of said source.

10. A scale-of-three multivibrator as claimed in claim 9 in which capacitors are shunted across said second, third and fifth resistors, and capacitors having higher values than said first mentioned capacitors are shunted across said first, fourth and sixth resistors.

11. A scale-of-three multivibrator comprising three electron tubes, each having a cathode, a control grid and an anode, first and second voltage dividers connected in the anode-cathode circuit of each of said tubes, and means connecting the grid of each said tube to the first voltage divider of one of said other tubes and to the second voltage divider of the other of said other tubes.

12. A scale-of-three multivibrator comprising three electron tubes, each having a cathode, a control grid, and an anode, a first and a second voltage divider connected in the anode-cathode circuit of each said tube, said first voltage dividers having substantially identical dividing characteristics and said second voltage dividers having substantially identical dividing characteristics but different from the dividing characteristics of said first voltage dividers, and means connecting the first voltage divider of one of said tubes and the second voltage divider of another of said tubes to the control grid of the remaining one of said tubes.

13. A scale-of-three multivibrator comprising first, second, and third electron tubes, each having a cathode, a control grid, and an anode, a first and a second voltage divider connected in the anode-cathode circuit of each said tube, said first voltage dividers having substantially identical dividing characteristics and said second voltage dividers having substantially identical dividing characteristics but different from the dividing characteristics of said first voltage dividers, means connecting the first voltage divider of said first tube and the second voltage divider of said second tube to the grid of said third tube, means connecting the first voltage divider of the second tube and the second voltage divider of the third tube to the grid of said first tube, and means connecting the first voltage divider of said third tube and the second voltage divider of the first tube to the grid of said second tube.

JOHN W. TAYLOR, Jr.

REFERENCES CITED

The following references are of record in the file of this patent:

Article: "Scale of N Counting Circuits," by Bradford Howland, from July 1947 Electronics—pages 138, 174, 176 and 178.